(12) United States Patent  
Kodaira (10) Patent No.: US 8,670,657 B2
(45) Date of Patent: Mar. 11, 2014

(54) RANGING APPARATUS, LENS SYSTEM, AND IMAGING APPARATUS

(75) Inventor: Masakazu Kodaira, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 110 days.

(21) Appl. No.: 13/227,541

(22) Filed: Sep. 8, 2011

(65) Prior Publication Data

US 2012/0063758 A1    Mar. 15, 2012

(30) Foreign Application Priority Data

Sep. 15, 2010    (JP) ................................. 2010-206766

(51) Int. Cl.
| | |
|---|---|
| G03B 17/00 | (2006.01) |
| G03B 7/099 | (2006.01) |
| G03B 13/00 | (2006.01) |
| G02B 7/28 | (2006.01) |
| G02B 7/04 | (2006.01) |
| G01C 3/00 | (2006.01) |
| H04N 5/232 | (2006.01) |

(52) U.S. Cl.
USPC .................. 396/77; 396/82; 396/85; 396/119; 396/120; 250/201.6; 356/3.13; 348/347; 348/348

(58) Field of Classification Search
USPC ............. 396/77, 82, 85, 119, 120; 250/201.6; 348/240.3, 347, 348; 356/3.13
See application file for complete search history.

(56) References Cited

U.S. PATENT DOCUMENTS

| | | | |
|---|---|---|---|
| 5,572,011 A | 11/1996 | Goto | |
| 5,966,550 A | 10/1999 | Oono et al. | |
| 5,996,550 A | 12/1999 | Israel et al. | |
| 2005/0036128 A1 | 2/2005 | Mihara et al. | |
| 2006/0256229 A1* | 11/2006 | Wernersson | 348/348 |

FOREIGN PATENT DOCUMENTS

| | | |
|---|---|---|
| CN | 1462905 A | 12/2003 |
| DE | 19655197 C2 | 9/1996 |
| GB | 2 001 223 A | 1/1979 |
| GB | 2001223 A | 1/1979 |
| GB | 2231676 A | 11/1990 |
| JP | 2067529 A | 3/1990 |
| JP | 2002-022424 A | 1/2002 |
| JP | 2003015029 A | 1/2003 |
| JP | 2004-012863 A | 1/2004 |
| JP | 2005134617 A | 5/2005 |

OTHER PUBLICATIONS

Gross, Herbert, "Chromatic Aberrations: Handbook of Optical Systems" Wiley, 2007, XP-002678174, pp. 268-280 (cited in EESR Jul. 17, 2012 for corres. EP11007481.2).

Extended European Search Report issued Jul. 17, 2012 for corresponding EP11007481.2.

JP Office Action issued Jul. 24, 2012 for corresponding JP2010-206766 (English translation provided).

(Continued)

Primary Examiner — Rochelle-Ann J Blackman
(74) Attorney, Agent, or Firm — Rossi, Kimms & McDowell LLP (57) ABSTRACT

The ranging apparatus of the present invention measures the distance to an object to be imaged by an imaging apparatus using the principle of triangulation ranging, and has a measurement unit in which a maximum distance that can be ranged to an object is not less than ½ of a maximum value of the hyper focal length of the imaging apparatus.

5 Claims, 6 Drawing Sheets

(56) References Cited

OTHER PUBLICATIONS

Partial European Search Report issued in Counterpart European Patent Application 11007481.2 dated Feb. 6, 2012.

Chinese Office Action issued in Chinese counterpart application No. CN201110272671.X, Dated Nov. 27, 2013. English translation provided.

* cited by examiner

FIG. 3A $H/2 = (fs \cdot 1s)/ds$

FIG. 3B $H/2 < (fs \cdot 1s)/ds$

RANGING APPARATUS, LENS SYSTEM, AND IMAGING APPARATUS

BACKGROUND OF THE INVENTION

1. Field of the Invention

The present invention relates to a ranging apparatus that can be attached to an imaging apparatus having an autofocus adjustment function, a lens system provided with this ranging apparatus, and an imaging apparatus.

2. Description of the Related Art

The processing carried out by autofocus adjustment in an imaging apparatus can be broadly divided into two processes: a focus detection process and a focus adjustment process. In the focus detection process, a ranging apparatus that is separate from the imaging apparatus is used in order to obtain high precision imaged object information. This ranging apparatus uses the principal of triangulation ranging in order to carry out focus detection. The principle of triangulation ranging includes a passive-type in which focus detection is carried out using the light that an object emits and an active-type in which ranging is carried out by detecting the reflection of light that is projected from the apparatus side toward an object. In this case, in the focus adjustment process, the optical system is focused based on the result of the focus detection. In this manner, in order to detect object information with high accuracy in the autofocus adjustment of an imaging apparatus, it is necessary to provide a ranging system in addition to an imaging system. Thus, in an imaging apparatus, the condition occurs in which the size of the imaging apparatus overall becomes large due to mounting the ranging system that is separate from the imaging system.

Conventionally, in order to resolve such a condition, a ranging-photometric apparatus has been proposed in which a ranging sensor and a photometric sensor are disposed on the same substrate and a plurality of independently provided ranging lenses and photometric sensors are integrally formed (refer, for example, to Japanese Patent Laid-Open No. 2004-12863). Note that a ranging optical system that includes ranging lenses is used as an imaging system and a photometric optical system that includes photometric lenses is used as a non-imaging system. According to this ranging-photometric apparatus, even if the ranging optical system and the photometric optical system are formed in one apparatus, high accuracy ranging and photometry become possible, and downsizing and cost reductions can be implemented.

In the conventional technology described above, downsizing is implemented by providing a ranging apparatus (or photometric apparatus) that alleviates optical restrictions that occur because the ranging lenses and the photometric lenses are an integral structure and the restrictions due to the necessary angle of view of the photometric lenses with respect to the ranging lenses. In addition, the accuracy of the ranging and the photometry is also realized by reducing the restrictions that accompany downsizing. In this connection, the accuracy of the ranging apparatus must be compatible with the focus accuracy that is required on the zoom lens side of the imaging apparatus on which the ranging apparatus is mounted. However, in a ranging apparatus that uses this conventional technology, satisfying ranging specifications that are compatible with the focusing accuracy required on this zoom lens side is not easy.

In consideration of such circumstances, the present invention provides a ranging apparatus that satisfies ranging specifications that are compatible with the focus accuracy required on the zoom lens side of an imaging apparatus.

SUMMARY OF THE INVENTION

The present invention is a ranging apparatus that measures the distance to an object to be imaged by an imaging apparatus by using the principle of triangulating ranging, wherein the ranging apparatus includes a measurement unit in which a maximum distance that can be ranged to the object is not less than ½ of a maximum value of a hyper focal length of the imaging apparatus. According to this structure, a focusable accuracy of ranging over an entire zoom range of the imaging apparatus can be obtained by the ranging apparatus.

In addition, the measurement unit includes a pair of lenses and a pair of sensors on which images of an object are respectively formed by the pair of lenses, wherein, where a maximum value of a hyper focal length of the imaging apparatus is denoted by H, the focal length of the pair of lenses is denoted by fs, a base line length defined by the distance between the optical axes of the pair of lenses is denoted by ls, and a minimum resolution of a displacement amount of the sensor is denoted by ds, then preferably the following condition is satisfied:

[Formula 1]

$$0.06 \leq (H \cdot ds)/(2 \cdot ls \cdot fs) \leq 2.5 \quad (1)$$

where $H = fit^2/(\delta \cdot Fnot)$ fit is the maximum focal length of the imaging apparatus $\delta$ is the circle of confusion of the imaging apparatus Fnot is the F number in the fit of the imaging apparatus.

According to the present invention, because a ranging apparatus can be obtained that satisfies the accuracy of ranging required over the entire zoom range of an imaging apparatus having an autofocus adjusting function, the effect can be attained that the focus accuracy of the imaging apparatus can be improved by the ranging apparatus according to the present invention.

Further features of the present invention will become apparent from the following description of exemplary embodiments with reference to the attached drawings.

DESCRIPTION OF THE EMBODIMENTS

Figure 1:
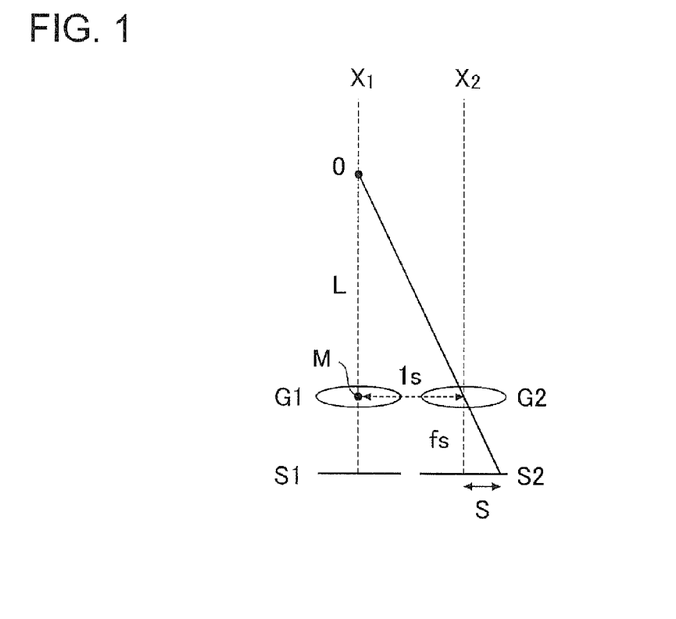
FIG. 1 is a conceptual drawing of a passive-type ranging apparatus.

In the present embodiment, below a passive-type ranging apparatus will be explained as an example, but this is not meant to be limiting. Therefore, the ranging apparatus may also be an active-type ranging apparatus provided that the principle of triangulating ranging is used. FIG. 1 is a conceptual drawing of a passive-type ranging apparatus. The passive-type ranging apparatus is provided with a measurement unit that includes a pair of lenses G1 and G2 having identical specifications, and sensors S1 and S2 that are arranged in opposition to each of the lenses G1 and G2. The lenses G1 and G2 are arranged such that optical axes X1 and X2 are parallel, and the distance between the optical axes X1 and X2 is defined as a base line length ls. On the optical axis X1, an image of an object O that is present at a position in opposition to the sensor S1 is formed on the sensors S1 and S2 via the lens G1. Here, a distance from the principal point position M of the lens G1 to the object O is denoted by L, a focal length of the lens G1 and lens G2 is denoted by fs, and a phase difference amount of the image formation point that is measured at the sensor S2 is denoted by S. Thus, by the principle of triangulating ranging, an object distance L is given by the following Formula:

$$L = (fs \cdot ls)/S$$

In the above Formula, because the focal length fs and the base line length ls are known values, the object distance L can be calculated by finding the phase difference amount S.

Figure 2A:
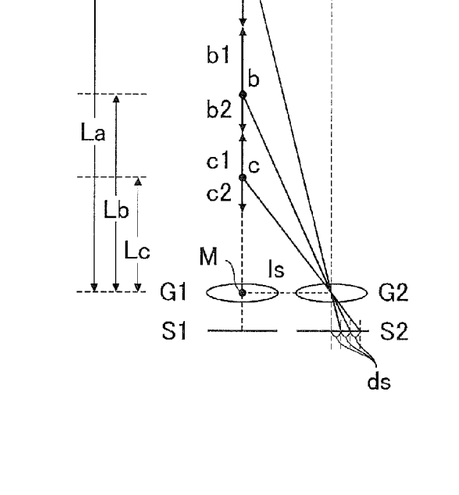
FIGS. 2A and 2B are conceptual drawings that show the conditions for the passive-type ranging apparatus required for the imaging apparatus.
Figure 2B:
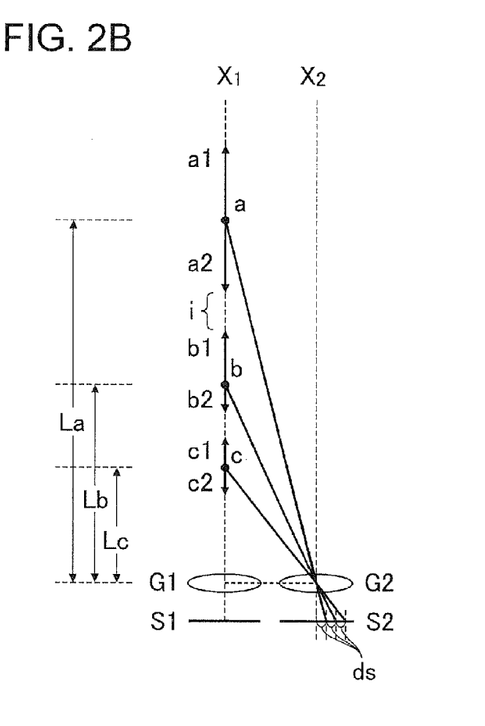

FIG. 2 is a conceptual diagram that shows the conditions of accuracy of ranging of a passive-type ranging apparatus that is found in relation to the zoom lens of the imaging apparatus. In FIG. 2, on the sensor S2, a minimum resolution of a displacement amount of the sensor S2 that expands in a direction horizontal to the base line length ls is denoted by ds. In addition, each of the object positions corresponding to the displacement amounts that are displaced in units of the minimum resolution ds are set to a, b, and c, and the distance from a principal point position M of the lens G1 to each of the objects is set to La, Lb, and Lc. Here, a denotes a maximum distance that can be ranged by the passive-type ranging apparatus. Furthermore, at each of the object positions, a forward object depths of field that are found by the image formation apparatus are set to a2, b2, and c2, and the rearward object depths of field are set to a1, b1, and c1.

In FIG. 2A, corresponding to the displacement amount of the minimum resolution ds, the object position a and the object position b are discretely adjacent to each other. Within a range between the object position a and the object position b, which are discretely adjacent, the forward object depth of field a2 of the object position a and the rearward object depth of field b1 of the object position b are continuous (i.e., without gaps). Therefore, in units of the displacement amount of the minimum resolution ds of the sensor S2, even if the distance between objects cannot be ranged, in the case of this continuous state, when viewed from the imaging apparatus side, a state occurs in which continuous focusing is possible. Therefore, according to the above structure, high accuracy focusing becomes possible.

In contrast, in FIG. 2B, a gap i between the forward object depth of field a2 of the object position a and the rearward object depth of field b1 of the object position b occurs within a range between the object position a and the object position b. Therefore, in this case, when viewed from the imaging apparatus side, an object present in the portion of this gap i is in a region in which focusing is not possible. Thus, when such a configuration is used, a high accuracy focus is difficult. Based on FIG. 2A and FIG. 2B, the following Formula must be satisfied when setting conditions having a high accuracy of ranging:

$$a2 + b1 \geq La - Lb$$

The measurement unit for the passive-type ranging apparatus may be configured so as to satisfy these conditions over the entire zoom range of the imaging apparatus. Here, where fit denotes the maximum focal length of the imaging apparatus, $\delta$ denotes the circle of confusion, and Fnot denotes the F number in the fit of the imaging apparatus, the above Formula can be expanded as follows:

$$a2 = (\delta \cdot Fnot \cdot La^2)/(fit^2 + \delta \cdot Fnot \cdot La)$$

$$b1 = (\delta \cdot Fnot \cdot Lb^2)/(fit^2 - \delta \cdot Fnot \cdot Lb)$$

$$La = (fs \cdot ls)/ds$$

$$Lb = (fs \cdot ls)/2ds$$

H is the maximum value of the hyper focal length of the imaging apparatus, that is, the focal length takes the maximum value at the telescopic end of the imaging apparatus, and when summarizing the above formula, the following formula holds:

$$H/2 \leq (fs \cdot ls)/ds$$

where $$H = fit^2/(\delta \cdot Fnot)$$

Figure 3A:
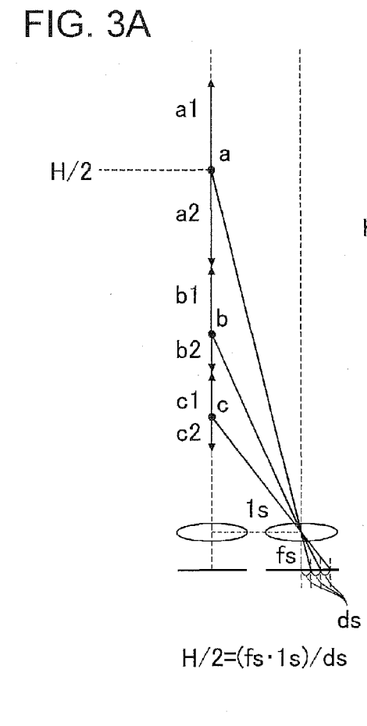
FIGS. 3A and 3B are conceptual drawings that show the accuracy of ranging of the passive-type ranging apparatus according to the present invention.

The right side of formula 1 represents the maximum distance that can be ranged in the passive-type ranging apparatus. Therefore, if this maximum distance that can be ranged is set to not less than ½ of the maximum of the hyper focal length of the imaging apparatus, a high accuracy of ranging can be maintained over the entire zoom range of the imaging apparatus. FIG. 3 is a conceptual figure that shows the state in which the conditions of formula 1 are satisfied, that is, the accuracy of ranging of the passive-type ranging apparatus according to the present invention. As shown in FIG. 2A, FIG. 3A shows the state in which the forward object depth of field a2 of the object position a and the rearward object depth of field b1 of the object b are continuous (i.e., without gaps). In this context, ½ of the hyper focal length is the position of the object position a.

Figure 3B:
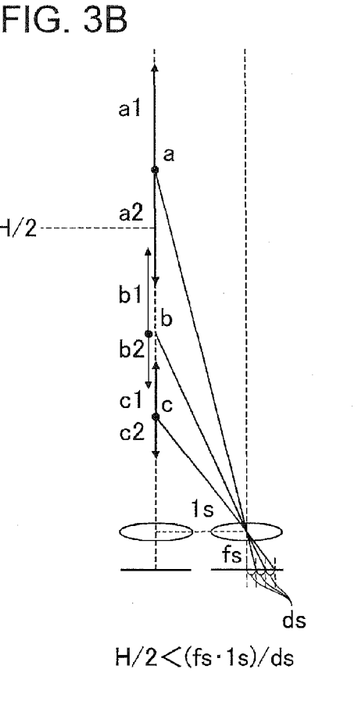

Because in formula 1, ½ of the maximum value of the hyper focus distance of the imaging apparatus may be equal to or less than the maximum distance that can be ranged by the imaging apparatus, a state such as that shown in FIG. 3B is satisfactory. That is, within a range between the object position a and the object position b, a portion of the forward object depth of field a2 of the object position a and a portion of the rearward object depth of field b1 of the object position b may be in an overlapping state. Note that the circle of confusion $\delta$ is set to twice the pitch of the imaging apparatus.

When the base line length and the focal length of a passive-type ranging apparatus become small, the accuracy of ranging decreases, and guaranteeing the brightness of the F number becomes difficult. In addition, the power of the passive-type ranging apparatus becomes strong and exhibiting an optical performance becomes difficult. In contrast, when the base line length and the focal length of a passive imaging apparatus become large, the problem occurs that the apparatus itself becomes large when attempting to guarantee the brightness of the F number. Thus, in the case in which the ranging apparatus according to the present invention is actually used by being attached to an imaging apparatus, preferably the following condition Formula is satisfied as a permitted range.

[Formula 1]

$$0.06 \leq (H \cdot ds)/(2 \cdot ls \cdot fs) \leq 2.5 \quad (1)$$

In Formula 1, where the numerical range exceeds 1, gaps such as those shown in FIG. 2B occur, but if the numerical range is 2.5 or less, this is a range in which the focus of the imaging apparatus is not hindered.

In order to realize a more precise autofocus adjustment function, focusing must always be continuously carried out on a moving object. To improve the capacity to track this moving object, the number of times that the ranging calculation is performed must be increased in a short period of time by a calculation processing circuit that is provided with sensors S1 and S2 and that calculates an object distance. To attain this, a prescribed amount of light must be taken in by the sensors S1 and S2 in a short time. Thus, the prescribed amount of light can be taken in by sensors S1 and S2 in a short time by making the F number of the passive-type ranging apparatus bright. The F number of the imaging apparatus is also related to the tracking capacity. When the F number of the imaging apparatus is dark, the tracking of a moving object by a passive-type ranging apparatus can be simplified by making the object depth of field deep. Contrariwise, when the F number of the imaging apparatus is bright, tracking the moving object by the passive-type ranging apparatus becomes difficult because the object depth of field becomes shallow. Based on the above, preferably the following condition Formula is satisfied with respect to the received light amount of the passive-type ranging apparatus.

[Formula 2]

$$1.06 \leq F\text{not}^2/(F\text{nosl} \cdot F\text{nosw}) \leq 32.9 \quad (2)$$

where Fnosl is the F number in a direction perpendicular to the base line length of the passive-type ranging apparatus and Fnosw is the F number in the direction of the base line of the passive-type ranging apparatus.

When Formula 2 exceeds the upper limit, the F number of the passive-type ranging apparatus becomes bright, and the apparatus overall becomes large. In addition, when Formula 2 does not reach the lower limit, the F number of the passive-type ranging apparatus becomes dark, the F number of the imaging apparatus becomes bright, and the tracking performance worsens.

Because the focal length of the passive-type ranging apparatus is fixed, the imaging field is always constant. In contrast, in the imaging apparatus, the imaging field is changed by the zoom. When the imaging field of the passive-type ranging apparatus becomes larger than the imaging field of the imaging apparatus, there is the shortcoming that the photographer may range objects other than the object that was originally intended for ranging. Contrariwise, when the image range of the passive-type ranging apparatus is smaller than the image range of the imaging apparatus, the ranged region becomes small, and capturing the object at which the photographer aims becomes difficult. Thus, the imaging field of the passive-type ranging apparatus must be set appropriately with respect to the imaging field of the imaging apparatus. Therefore, preferably the following condition Formula is satisfied in relation to the imaging field of the passive-type ranging apparatus and the imaging apparatus.

[Formula 3]

$$0.005 \leq fs/\text{fit} \leq 0.2 \quad (3)$$

When the focal length of the passive-type ranging apparatus becomes large, the upper limit of the condition Formula 3 is exceeded, and when attempting to guarantee the brightness of the F number, the passive-type ranging apparatus becomes large. When the focal length of the passive-type ranging apparatus becomes small, the lower limit of the condition Formula 3 is exceeded, and the image field of the passive-type ranging apparatus becomes larger than the image field of the imaging apparatus. The result of this is that the photographer may range objects other than the object that the photographer originally intended to range. In addition, because the focal length of the passive-type ranging apparatus becomes small, the accuracy of ranging decreases. Furthermore, because the power of the passive-type ranging apparatus becomes strong, exhibiting the optical capacity becomes difficult.

When the chromatic aberration is large, misalignment of the image formation positions on the sensors S1 and S2 occurs due to the wavelength, and the object is formed out of focus. Thus, the resolution at which the object is formed decreases, and ranging an object having a high spatial frequency becomes difficult. Thus, preferably the following condition Formula is satisfied with respect to the chromatic aberration of the passive-type ranging apparatus.

[Formula 4]

$$\left| \sum_i \frac{1}{fsi \cdot vsi} \right| \leq 0.002(1/\text{mm}) \quad (4)$$

where fsi is the focal length of each lens that forms the passive-type ranging apparatus, and vsi is the Abbe number of each lens that forms the passive-type ranging apparatus.

When the chromatic aberration is not sufficiently corrected in the passive-type ranging apparatus, the upper limit of the condition Formula 4 is exceeded, and then ranging an object having a high spatial frequency becomes difficult.

Embodiments

Next, specific embodiments of the passive-type ranging apparatus will be provided. In any of the embodiments, the structure of the passive-type ranging apparatus may include, in sequence from the object side, a lens L, an aperture P, a sensor S, and a cover glass for a sensor interposed therebetween. In the aberration figures, the e line and the g line in the axial chromatic aberration figure and the magnified chromatic aberration figure are respectively the aberrations at wavelengths of 546 nm and 436 nm. ΔS denotes the sagittal and ΔM denotes the meridional. In addition, in the figure, Fno denotes the F number, and ω denotes the half angle of field (in degrees). In the figures, r denotes the radius of curvature, d denotes the lens thickness of the lens gap, nd denotes the refractive index at a wavelength of 546 nm, vd denotes the Abbe number, and * denotes a non-spherical surface. A non-spherical surface is defined by the following Formula.

$$x = cy^2/[1+[1-(1+K)c^2y^2]^{1/2}] + A_4 y^4 + A_6 y^6 + A_8 y^8 + A_{10} y^{10} \quad [\text{Formula 5}]$$

where c denotes the curvature (1/r), y is the height from the optical axis, k is the conical coefficient, and A4, A6, A8, A10 . . . denote the non-spherical coefficients of the each of the orders.

In addition, the three zoom lenses of the imaging apparatus used in the present embodiment are as follows:

[Zoom lens 1]

| | |
|---|---|
| Maximum focal length (fit) of the imaging apparatus | 100 mm |
| F number (Fnot) of the fit of the imaging apparatus | 4 |
| Circle of confusion (δ) of the imaging apparatus | 0.01 mm |
| Minimum resolution (ds) of the displacement amount of the imaging apparatus | $9.38 \times 10^{-5}$ mm |

[Zoom lens 2]

| | |
|---|---|
| Maximum focal length (fit) of the imaging apparatus | 322 mm |
| F number (Fnot) of the fit of the imaging apparatus | 5.2 |
| Circle of confusion (δ) of the imaging apparatus | 0.01 mm |
| Minimum resolution (ds) of the displacement amount of the imaging apparatus | $9.38 \times 10^{-5}$ mm |

[Zoom lens 3]

| | |
|---|---|
| Maximum focal length (fit) of the imaging apparatus | 1400 mm |
| F number (Fnot) of the fit of the imaging apparatus | 12 |
| Circle of confusion (δ) of the imaging apparatus | 0.01 mm |
| Minimum resolution (ds) of the displacement amount of the imaging apparatus | $5.86 \times 10^{-6}$ mm |

First Embodiment

Figure 4:
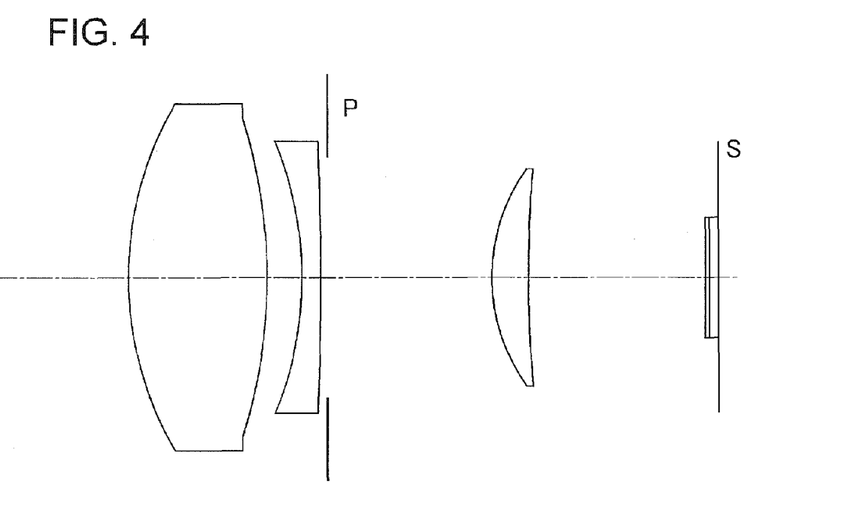
FIG. 4 shows the configuration of the lenses of a first embodiment of the ranging apparatus according to the present invention.
Figure 5:
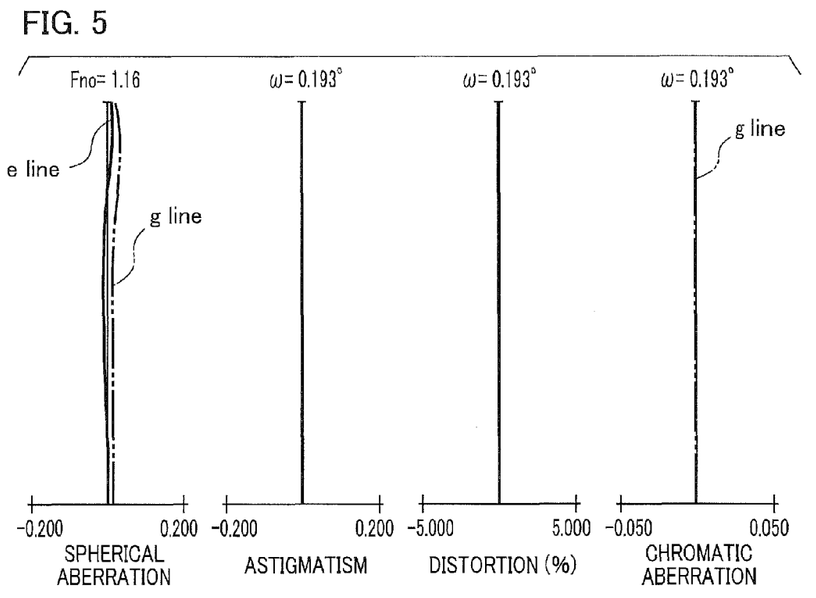
FIG. 5 shows the aberrations in a direction perpendicular to the base line length of the lens of FIG. 4.
Figure 6:
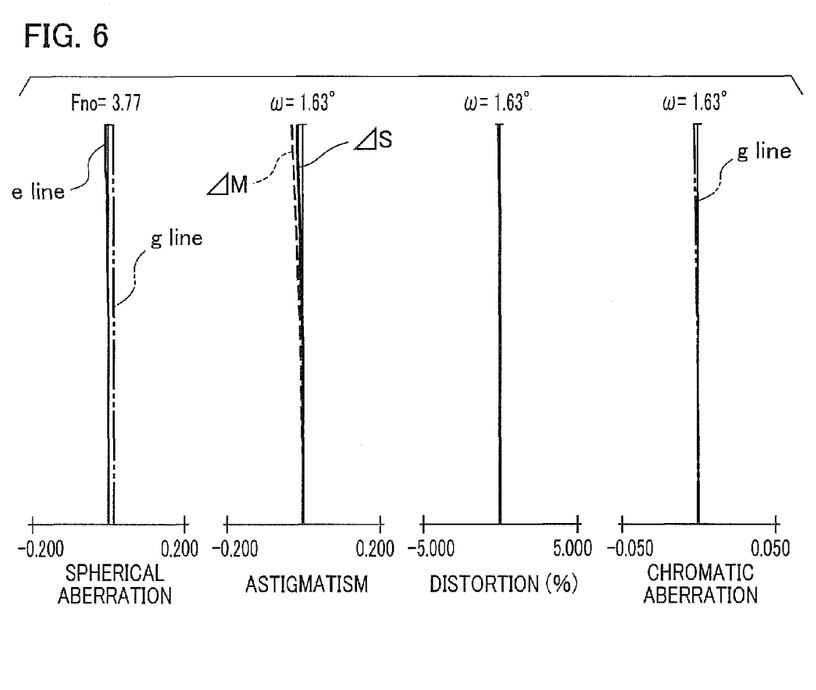
FIG. 6 shows the aberrations in a direction of the base line length of the lenses of FIG. 5.

FIG. 4 is a structural drawing of the passive-type ranging apparatus according to a first embodiment, FIG. 5 is the aberration in a direction perpendicular to the base line length, FIG. 6 shows the aberration in a direction of the base line length, and TABLE 1 shows the numerical data of the optical system for a sensor S. The first embodiment is formed, in sequence from the object side, by three lenses: a positive lens, a negative lens, and a positive lens. TABLE 2 shows the values corresponding to each of the condition Formulas 1 to 4 for zoom lenses 1 to 3.

TABLE 1

Unit mm

Plane data

| Plane number | r | d | nd | vd | Effective Diameter |
|---|---|---|---|---|---|
| 1 | 18.022 | 7.58 | 1.58913 | 61.1 | 17.24 |
| 2 | −27.581 | 1.88 | | | 15.57 |
| 3 | −18.909 | 1.00 | 1.84666 | 23.8 | 13.47 |
| 4 | −162.878 | 0.37 | | | 13.21 |
| 5(aperture) | ∞ | 8.79 | | | 13.8 (direction perpendicular to base line length) 2.89 (longitudinal direction of the base line length) |
| 6 | 9.852 | 2.00 | 1.58913 | 61.1 | 10.55 |
| 7 | 74.502 | 9.39 | | | 10.16 |
| 8 | ∞ | 0.30 | 1.52000 | 55.0 | 6.00 |
| 9 | ∞ | 0.45 | 1.51000 | 43.0 | 6.00 |
| 10 | ∞ | 0.00 | | | 6.00 |
| 11 | ∞ | (variable) | | | 6.00 |
| Image plane | ∞ | | | | |

| | |
|---|---|
| Focal distance | 20.00 |
| F number (direction perpendicular to base line length) | 1.16 |
| F number (longitudinal direction of the base line length) | 3.77 |
| Base line length | 9.00 |
| Image field (direction perpendicular to base line length) | 0.1933 |
| Image field (longitudinal direction of the base line length) | 1.63 |
| Image height (direction perpendicular to base line length) | 0.0675 |
| Image height (longitudinal direction of the base line length) | 0.57 |
| Lens total length | 31.59 |
| BF | −0.15 |
| Incident pupil position | 10.27 |
| Emitting pupil position | −27.03 |
| Forward main point position | 15.31 |
| Rearward main point position | −20.29 |

Lens group data

| Group | First Plane | Focal Distance | Lens configuration Length | Forward main point position | Rearward main point position |
|---|---|---|---|---|---|
| 1 | 1 | 20.00 | 31.74 | 15.31 | −20.29 |

Single lens data

| Lens | First Plane | Focal point Distance |
|---|---|---|
| 1 | 1 | 19.64 |
| 2 | 3 | −25.10 |
| 3 | 6 | 18.98 |
| 4 | 8 | 0.00 |
| 5 | 9 | 0.00 |

TABLE 2

| | Zoom lens 1 | Zoom lens 2 | Zoom lens 3 |
|---|---|---|---|
| Formula 1 | 0.06 | 0.52 | 0.27 |
| Formula 2 | 3.66 | 6.17 | 32.9 |
| Formula 3 | 0.2 | 0.062 | 0.014 |
| Formula 4 | $3.73^{-5}$ | $3.73^{-5}$ | $3.73^{-5}$ |

Second Embodiment

Figure 7:
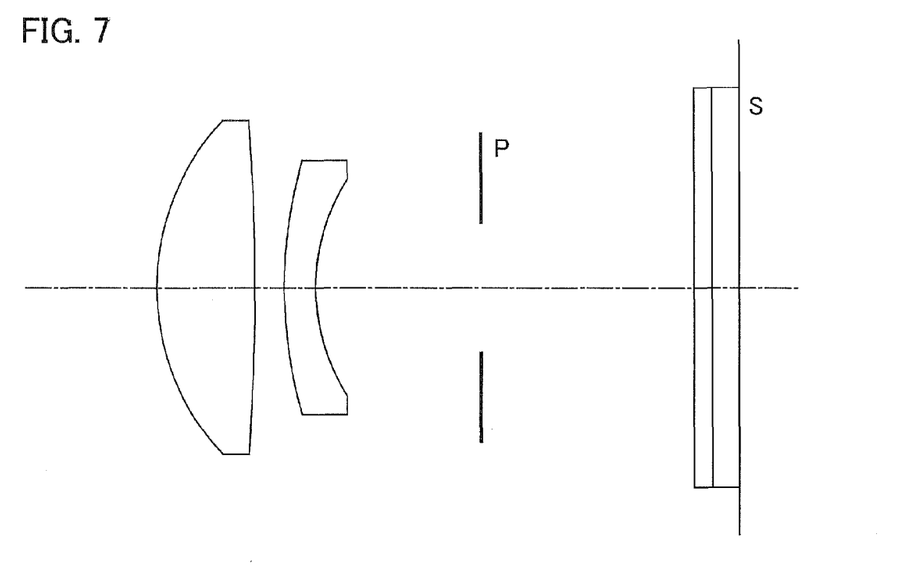
FIG. 7 shows the configuration of the lenses of a second embodiment of the ranging apparatus according to the present invention.
Figure 8:
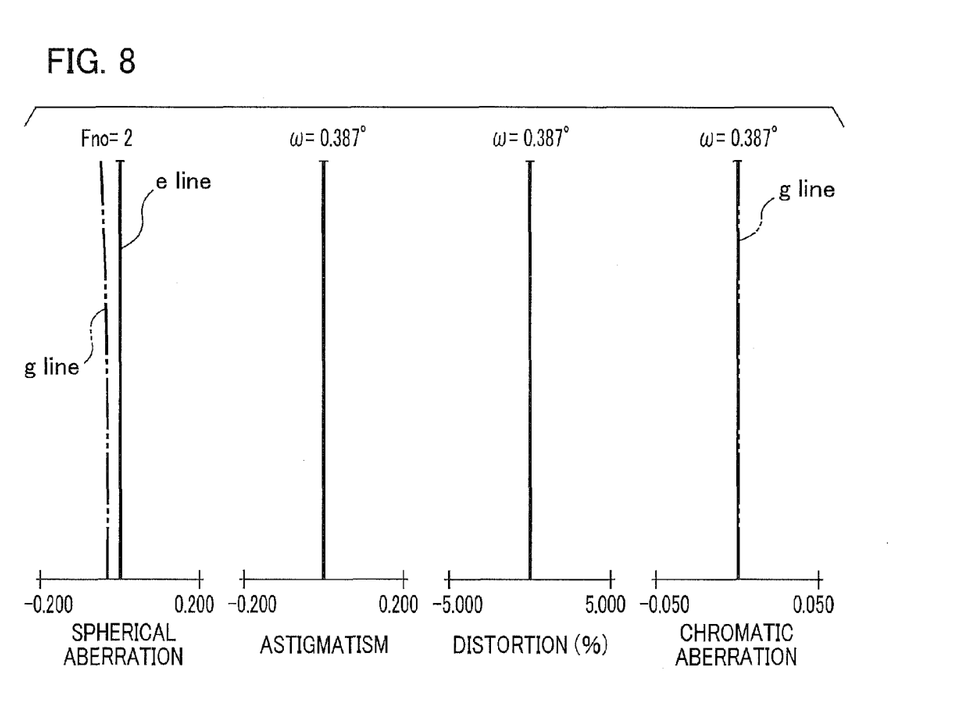
FIG. 8 shows the aberrations in a direction perpendicular to the base line length of the lenses in FIG. 7.
Figure 9:
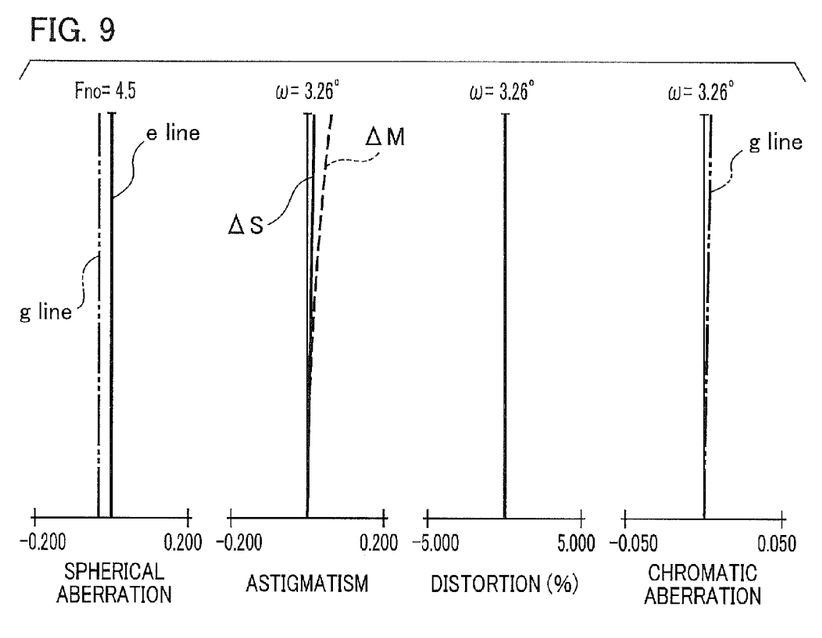
FIG. 9 shows the aberrations in a direction of the base line length of the lenses in FIG. 7.

FIG. 7 is a structural drawing of the passive-type ranging apparatus according to a second embodiment, FIG. 8 shows the aberration in a direction perpendicular to the base line length, FIG. 9 shows the aberration in a horizontal direction of the base line length, and TABLE 3 shows the numerical data of the optical system for a sensor S. The second embodiment is formed, in sequence from the object side, by two lenses: a positive lens and a negative lens. TABLE 4 shows the values corresponding to each of the condition Formulas 1 to 4 for zoom lenses 1 to 3.

TABLE 3

Unit mm

Plane data

| Plane number | r | d | nd | vd | Effective Diameter |
|---|---|---|---|---|---|
| 1* | 3.536 | 1.62 | 1.58913 | 61.1 | 5.00 |
| 2 | −38.725 | 0.50 | | | 4.67 |
| 3 | 7.091 | 0.52 | 1.80518 | 25.4 | 3.83 |
| 4 | 3.280 | 2.71 | | | 3.28 |
| 5(aperture) | ∞ | 3.48 | | | 2.08 (direction perpendicular to base line length) 0.89 (longitudinal direction of the base line length) |
| 6 | ∞ | 0.30 | 1.52000 | 55.0 | 6.00 |
| 7 | ∞ | 0.45 | 1.51000 | 43.0 | 6.00 |
| 8 | ∞ | 0.00 | | | 6.00 |
| 9 | ∞ | (variable) | | | 6.00 |
| Image plane | ∞ | | | | |

Non-spherical data
First plane

K = 2.52542e−009   A4 = −1.87264e−003   A6 = −1.28508e−004
A8 = 1.26629e−007   A10 = −1.9689e−006

| | |
|---|---|
| Focal distance | 10.00 |
| F number (direction perpendicular to base line length) | 2.0 |
| F number (longitudinal direction of the base line length) | 4.5 |
| Base line length | 9.6 |
| Image field (direction perpendicular to base line length) | 0.387 |
| Image field (longitudinal direction of the base line length) | 3.26 |
| Image height (direction perpendicular to base line length) | 0.0675 |
| Image height (longitudinal direction of the base line length) | 0.57 |
| Lens total length | 9.53 |
| BF | −0.03 |
| Incident pupil position | 12.99 |
| Emitting pupil position | −3.97 |
| Forward main point position | −2.43 |
| Rearward main point position | −10.03 |

Lens group data

| Group | First Plane | Focal Distance | Lens configuration Length | Forward main point position | Rearward main point position |
|---|---|---|---|---|---|
| 1 | 1 | 10.00 | 9.57 | −2.43 | −10.03 |

Single lens data

| Lens | First Plane | Focal point Distance |
|---|---|---|
| 1 | 1 | 5.56 |
| 2 | 3 | −7.99 |
| 3 | 6 | 0.00 |
| 4 | 7 | 0.00 |

TABLE 4

| | Zoom lens 1 | Zoom lens 2 | Zoom lens 3 |
|---|---|---|---|
| Formula 1 | 0.12 | 1.00 | 0.50 |
| Formula 2 | 1.78 | 3.00 | 16.0 |
| Formula 3 | 0.1 | 0.031 | 0.007 |
| Formula 4 | $1.98^{-3}$ | $1.98^{-3}$ | $1.98^{-3}$ |

Third Embodiment

Figure 10:
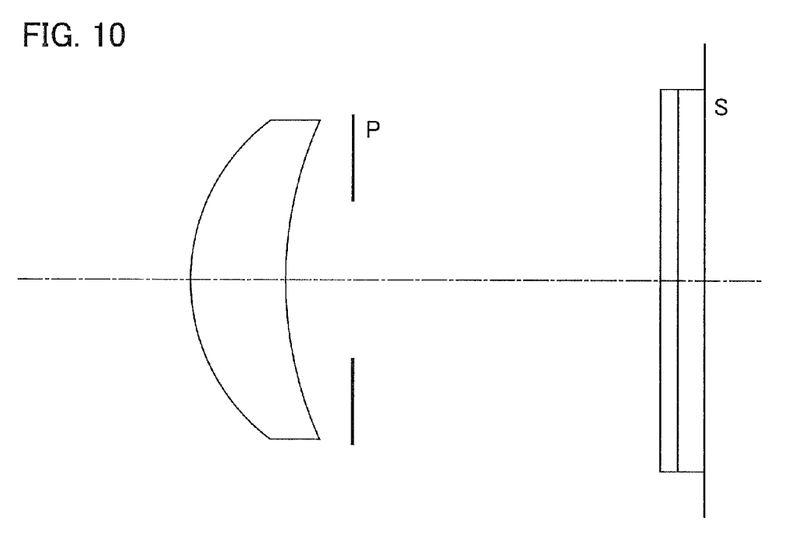
FIG. 10 shows the aberrations of the lens of a third embodiment of the ranging apparatus according to the present invention.
Figure 11:
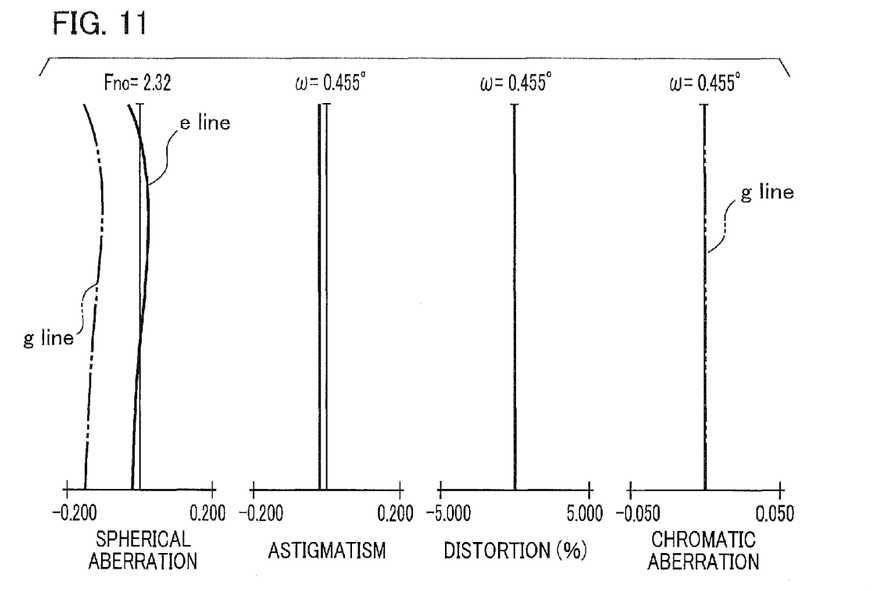
FIG. 11 shows the aberrations in a direction perpendicular to the base line length of the lenses in FIG. 10.
Figure 12:
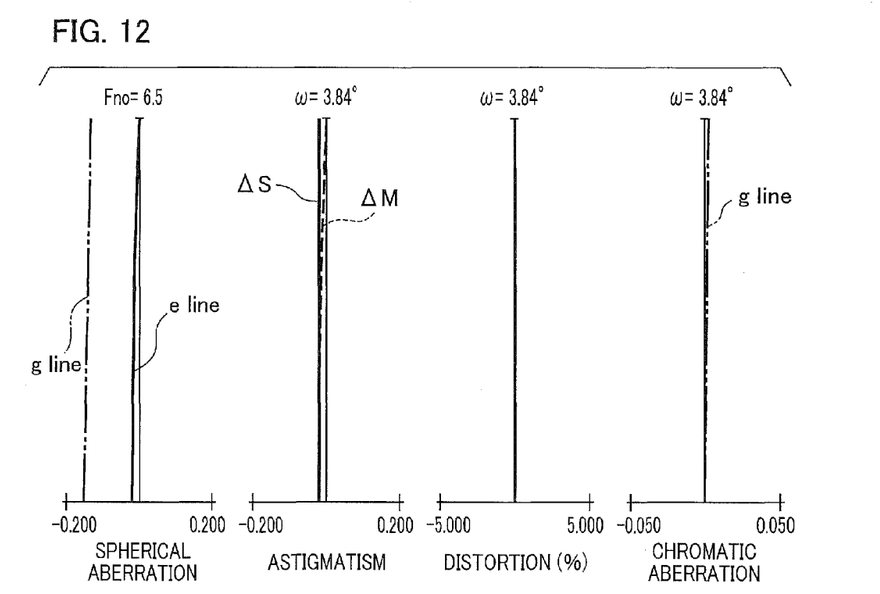
FIG. 12 shows the aberrations in a direction of the base line length of the lenses in FIG. 10.

FIG. 10 is a structural drawing of the passive-type ranging apparatus according to a third embodiment, FIG. 11 is the aberration in a direction perpendicular to the base line length, FIG. 12 shows the aberration in a horizontal direction of the base line length, and TABLE 5 shows the numerical data of the optical system for a sensor S. The third embodiment is formed by one lens, a positive lens. TABLE 6 shows the values corresponding to each of the condition Formulas 1 to 4 for zoom lenses 1 to 3.

TABLE 5

Unit mm

Plane data

| Plane number | r | d | nd | vd | Effective Diameter |
|---|---|---|---|---|---|
| 1* | 3.117 | 1.65 | 1.58913 | 61.1 | 5.00 |
| 2 | 6.590 | 1.16 | | | 5.00 |
| 3(aperture) | ∞ | 5.22 | | | 2.62 (direction perpendicular to base line length) 0.88 (longitudinal direction of the base line length) |
| 4 | ∞ | 0.30 | 1.52000 | 55.0 | 6.00 |
| 5 | ∞ | 0.45 | 1.51000 | 43.0 | 6.00 |
| 6 | ∞ | 0.00 | | | 6.00 |
| 7 | ∞ | (variable) | | | 6.00 |
| Image plane | ∞ | | | | |

Non-spherical data
First plane

K = 2.52542e−009   A4 = −1.87265e−003   A6 = −1.28508e−004
A8 = −1.26629e−007   A10 = −1.19689e−006

| | |
|---|---|
| Focal distance | 8.50 |
| F number (direction perpendicular to base line length) | 2.32 |
| F number (longitudinal direction of the base line length) | 6.5 |
| Base line length | 4.5 |
| Image field (direction perpendicular to base line length) | 0.455 |
| Image field (longitudinal direction of the base line length) | 3.84 |
| Image height (direction perpendicular to base line length) | 0.0675 |
| Image height (longitudinal direction of the base line length) | 0.57 |
| Lens total length | 8.73 |
| BF | −0.04 |
| Incident pupil position | 3.45 |
| Emitting pupil position | −7.71 |
| Forward main point position | −0.79 |
| Rearward main point position | −8.54 |

Lens group data

| Group | First Plane | Focal Distance | Lens configuration Length | Forward main point position | Rearward main point position |
|---|---|---|---|---|---|
| 1 | 1 | 8.50 | 8.77 | −0.79 | −8.54 |

Single lens data

| Lens | First Plane | Focal point Distance |
|---|---|---|
| 1 | 1 | 8.50 |
| 2 | 4 | 0.00 |
| 3 | 5 | 0.00 |

TABLE 6

|  | Zoom lens 1 | Zoom lens 2 | Zoom lens 3 |
|---|---|---|---|
| Formula 1 | 0.31 | 2.44 | 1.25 |
| Formula 2 | 1.06 | 1.79 | 9.55 |
| Formula 3 | 0.09 | 0.026 | 0.006 |
| Formula 4 | $1.92^{-3}$ | $1.92^{-3}$ | $1.92^{-3}$ |

As is clear from TABLE 2, TABLE 4, and TABLE 6, the numerical values of the zoom lenses 1 to 3 in the first embodiment to the third embodiment all satisfy the condition Formulas.

Note that the ranging apparatus may form a zoom lens that carries out autofocus adjustment based on the detection result for the distance to the object by this ranging apparatus, and at the same time, may form a lens system or form an imaging apparatus provided with this lens system and an imaging element such as a CCD and a CMOS.

While the embodiments of the present invention have been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-206766 filed Sep. 15, 2010 which is hereby incorporated by reference herein in its entirety.

What is claimed is:

1. A ranging apparatus that measures the distance to an object to be imaged by an imaging apparatus using the principle of triangulation ranging, the ranging apparatus comprising:
a measurement unit that ranges a maximum distance of not less than ½ of a maximum value of a hyper focal length of the imaging apparatus,
wherein the measurement unit includes a pair of lenses and a pair of sensors on which an image of the object is formed by the pair of lenses,
wherein when fs is the focal length of the pair of lenses of the measurement unit and fit is the maximum focal length of the imaging apparatus, the following conditional expression is satisfied:

$0.005 \leq fs/fit \leq 0.2$ wherein when fsi is the focal length of each of the lenses that form the ranging apparatus and vsi is the Abbe number of each of the lenses that form the ranging apparatus, the following conditional expression is satisfied:

$$\left| \sum_i \frac{1}{fsi \cdot vsi} \right| \leq 0.002 (1/mm).$$

2. The ranging apparatus according to claim 1, wherein where H is the maximum value of the hyper focal length of the imaging apparatus, ls is a base line length that is defined by a distance between optical axes of the pair of lenses of the measurement unit, and ds is a minimum resolution of a displacement amount of the sensors of the measurement unit, the following conditional expression is satisfied:

$0.06 \leq (H \cdot ds)/(2 \cdot ls \cdot fs) \leq 2.5$ where $H = fit^2/(\delta \cdot Fnot)$,
δ: circle of confusion of the imaging apparatus, and
Fnot: F number in the fit of the imaging apparatus.

3. The ranging apparatus according to claim 2, wherein when Fnosl is the F number in a direction perpendicular to the base line length of the measurement unit and Fnosw is the F number in a direction of the base line length of the measurement unit, the following conditional expression is satisfied:

$1.06 \leq Fnot2/(Fnosl \cdot Fnosw) \leq 32.9.$

4. A lens system comprising:
a ranging apparatus that measures the distance to an object to be imaged by an imaging apparatus using the principle of triangulation ranging, the ranging apparatus comprising:
a measurement unit that ranges a maximum distance of not less than ½ of a maximum value of a hyper focal length of the imaging apparatus,
wherein the measurement unit includes a pair of lenses and a pair of sensors on which an image of an object is formed by the pair of lenses,
wherein when fs is the focal length of the pair of lenses of the measurement unit and fit is the maximum focal length of the imaging apparatus, the following conditional expression is satisfied:

$0.005 \leq fs/fit \leq 0.2$ wherein when fsi is the focal length of each of the lenses that form the ranging apparatus and vsi is the Abbe number of each of the lenses that form the ranging apparatus, the following conditional expression is satisfied:

$$\left| \sum_i \frac{1}{fsi \cdot vsi} \right| \leq 0.002 (1/mm);$$

and
a zoom lens that carries out autofocus adjustment based on a distance detected by the ranging apparatus.

5. An imaging apparatus comprising
a ranging apparatus that measures the distance to an object to be imaged by an imaging apparatus using the principle of triangulation ranging, and having a measurement unit that ranges a maximum distance of not less than ½ of a maximum value of a hyper focal length of the imaging apparatus,
wherein the measurement unit includes a pair of lenses and a pair of sensors on which an image of an object is formed by the pair of lenses,
wherein when fs is the focal length of the pair of lenses of the measurement unit and fit is the maximum focal length of the imaging apparatus, the following conditional expression is satisfied:

$0.005 \leq fs/fit \leq 0.2$ wherein when fsi is the focal length of each of the lenses that form the ranging apparatus and vsi is the Abbe number of each of the lenses that form the ranging apparatus, the following conditional expression is satisfied:

$$\left| \sum_i \frac{1}{fsi \cdot vsi} \right| \leq 0.002 (1/mm);$$

an imaging element; and
a zoom lens for leading light from the object to the imaging element,
wherein the zoom lens configured to carry out autofocus adjustment based on a distance detected by the ranging apparatus.

* * * * *